US008842743B2

(12) United States Patent
Aoki et al.

(10) Patent No.: US 8,842,743 B2
(45) Date of Patent: Sep. 23, 2014

(54) COMMUNICATION DEVICE, BASE STATION, AND BASE STATION SYSTEM

(75) Inventors: Tsuguhide Aoki, Kawasaki (JP); Yuji Tohzaka, Kawasaki (JP); Yasuhiko Tanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 134 days.

(21) Appl. No.: 13/612,592

(22) Filed: Sep. 12, 2012

(65) Prior Publication Data
US 2013/0070816 A1 Mar. 21, 2013

(30) Foreign Application Priority Data

Sep. 20, 2011 (JP) ................................. 2011-205135

(51) Int. Cl.
*H04B 3/00* (2006.01)
*H04W 72/04* (2009.01)
(52) U.S. Cl.
CPC .................................. *H04W 72/046* (2013.01)
USPC ........... 375/257; 375/219; 375/295; 375/316; 375/267
(58) Field of Classification Search
USPC ....................................................... 375/267
See application file for complete search history.

(56) References Cited

U.S. PATENT DOCUMENTS

| 7,426,232 | B2 | 9/2008 | Matsuoka et al. |
| 8,000,649 | B2 | 8/2011 | Shiff et al. |
| 2005/0213505 | A1 | 9/2005 | Iochi et al. |
| 2007/0008939 | A1 | 1/2007 | Fischer |

FOREIGN PATENT DOCUMENTS

| JP | 2000-032044 A | 1/2000 |
| JP | 2004-064691 A | 2/2004 |
| JP | 2005-518760 A | 6/2005 |
| JP | 2007-519267 A | 7/2007 |
| JP | 2008-546357 A | 12/2008 |
| WO | WO 03/073682 A1 | 9/2003 |
| WO | WO 2005/050855 A1 | 6/2005 |
| WO | WO 2006/135697 A1 | 12/2006 |

OTHER PUBLICATIONS

Japanese Office Action dated Sep. 20, 2013 (and English translation thereof) in counterpart Japanese Application No. 2011-205135.
Japanese Office Action dated Jul. 9, 2013 (and English translation thereof) in counterpart Japanese Application No. 2011-205135.

*Primary Examiner* — Lihong Yu
(74) *Attorney, Agent, or Firm* — Holtz Holtz Goodman & Chick PC

(57) ABSTRACT

According to one embodiment, a communication device communicates with N remote units. Each remote unit includes a plurality of antennas, wireless transmitting units, and wireless receiving units. The communication device is provided with a received signal processing unit, to which received signals by a plurality of the wireless receiving units are combined and input, and which specifies the remote unit subjected to interference, and a switch which decreases a reception gain of the wireless receiving unit included in N−1 remote units out of the N remote units in a predetermined measurement section. The received signal processing unit calculates a correlation value between the combined received signals and a reference signal transmitted by a user terminal connected to another base station system in the measurement section and specifies the remote unit subjected to the interference by the second user terminal based on the correlation value.

20 Claims, 5 Drawing Sheets

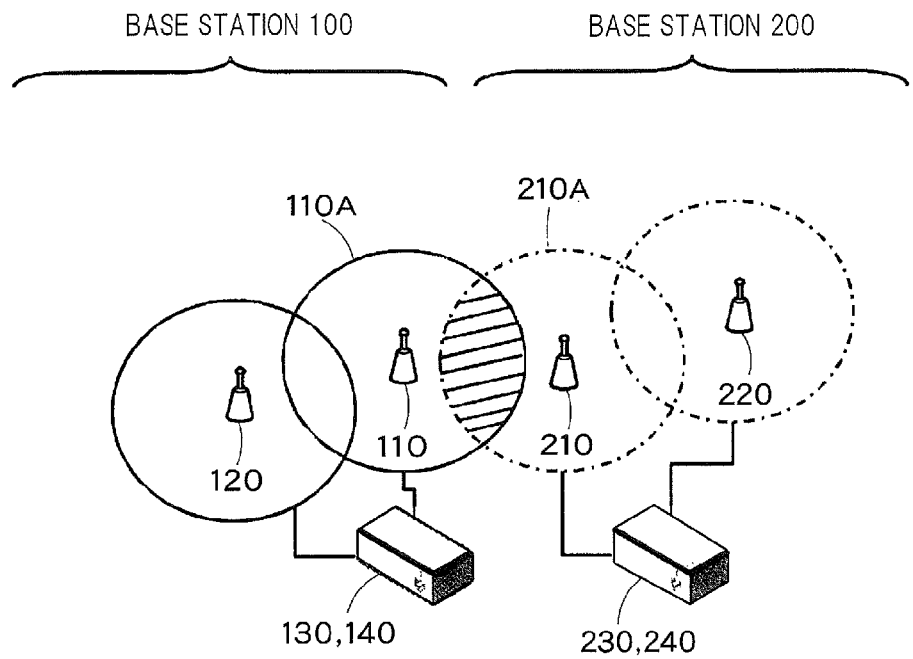
F I G. 1A
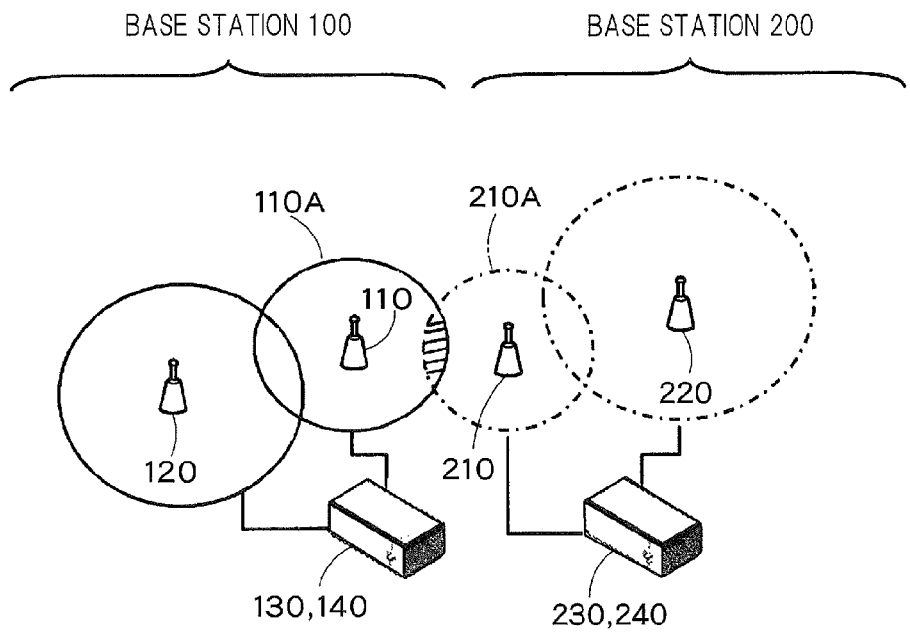
F I G. 1B

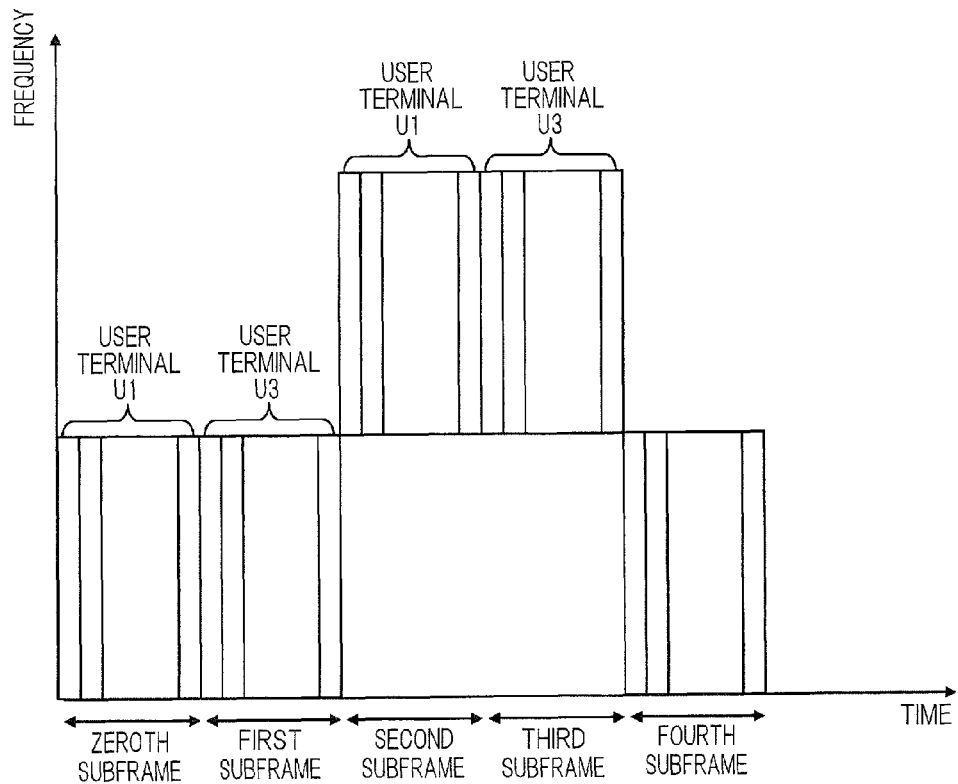
F I G. 7
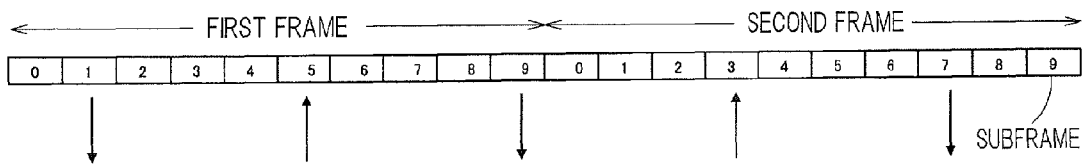
F I G. 8

COMMUNICATION DEVICE, BASE STATION, AND BASE STATION SYSTEM

CROSS REFERENCE TO RELATED APPLICATION

This application is based upon and claims benefit of priority from the Japanese Patent Application No. 2011-205135, filed on Sep. 20, 2011, the entire contents of which are incorporated herein by reference.

FIELD

Embodiments described herein relate generally to a communication device, a base station, and a base station system.

BACKGROUND

A distributed antenna base station is known as countermeasures against a dead zone of a cellular wireless system in a building and an underground mall. The distributed antenna base station is provided with a plurality of remote units, each having a plurality of antennas, a hub unit, which distributes signals to the remote units and combines the signals from the remote units, and a signal processing unit, which performs digital signal processing for transmission and reception. The remote units are arranged so as to be geographically distant from each other.

When a plurality of such distributed antenna base stations are arranged, service area boundaries (cell boundaries) of the distributed antenna base stations overlap with each other. In long term evolution (LTE), which is a standard of the cellular wireless system capable of performing high-speed communication designed in a 3rd generation partnership project (3GPP), there is a case in which different distributed antenna base stations use a same frequency. In this case, the above-described cell boundary becomes an interference area, whereby there is a problem of deterioration in throughput.

BRIEF DESCRIPTION OF THE DRAWINGS

FIGS. 1A and 1B are figures illustrating an example of an interference area generated when a plurality of distributed antenna base stations are provided;

FIG. 7 is a view illustrating an example of an SRS transmission pattern of a user terminal; and FIG. 8 is a view illustrating an example of a frame and transmission timing of the user terminal.

DETAILED DESCRIPTION

Figure 2:
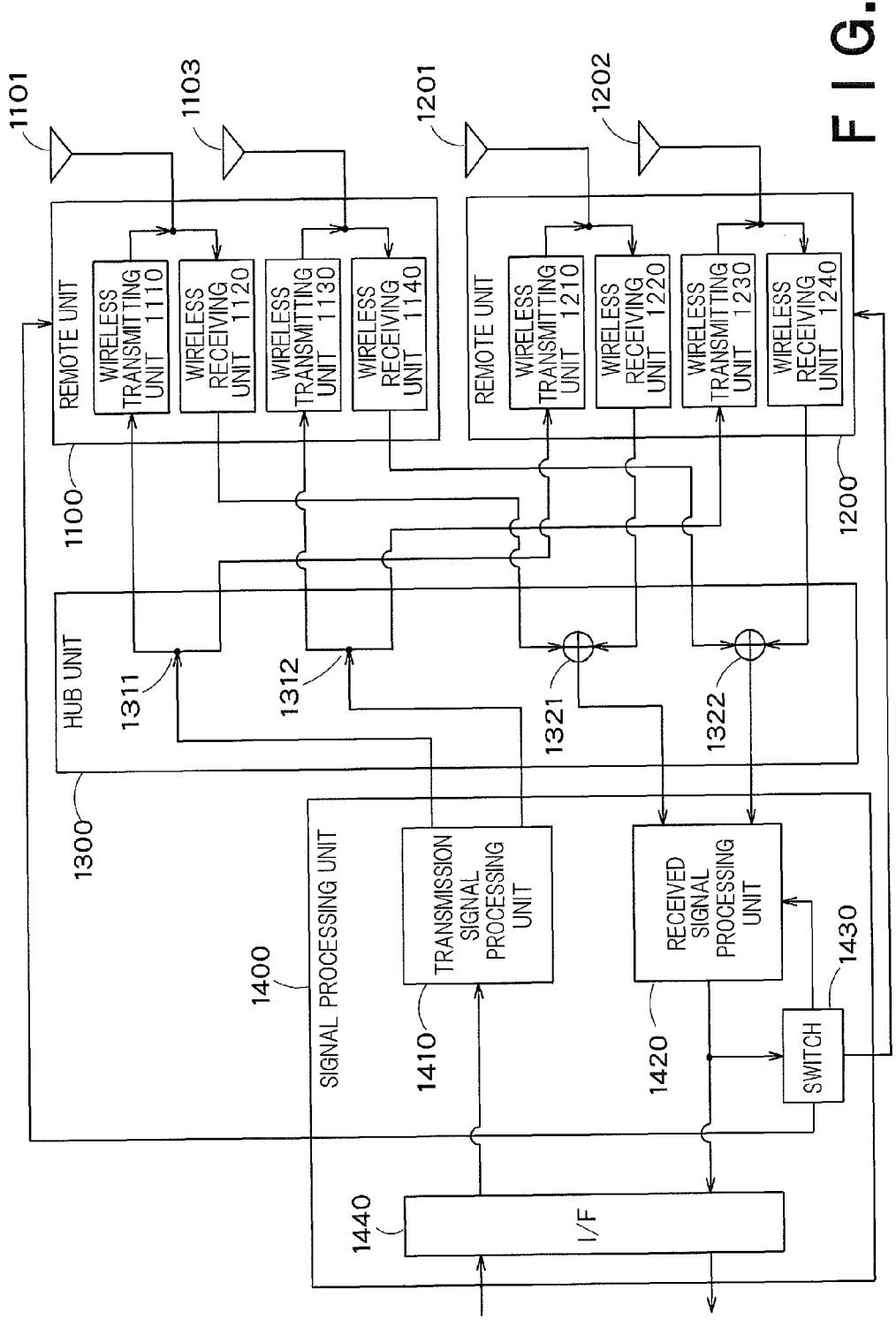
FIG. 2 is a schematic configuration diagram of a base station system according to a first embodiment of the present invention.

According to one embodiment, a communication device communicates with N (N is an integer not smaller than 2) remote units. Each remote unit includes a plurality of antennas, wireless transmitting units, and wireless receiving units. The communication device is provided with a received signal processing unit, to which received signals by a plurality of the wireless receiving units are combined and input, and which specifies the remote unit subjected to interference, and a switch which decreases a reception gain of the wireless receiving unit included in N−1 remote units out of the N remote units in a predetermined measurement section. The received signal processing unit calculates a correlation value between the combined received signals and a reference signal transmitted by a user terminal connected to another base station system in the measurement section and specifies the remote unit subjected to the interference by the second user terminal based on the correlation value.

First, an interference area generated when a plurality of distributed antenna base stations are provided is described with reference to FIG. 1A. FIG. 1A illustrates an example in which two base stations 100 and 200 are provided. The base station 100 is provided with remote units 110 and 120, a hub unit 130, and a signal processing unit 140. Also, the base station 200 is provided with remote units 210 and 220, a hub unit 230, and a signal processing unit 240. Each of the remote units 110, 120, 210, and 220 includes an antenna, which transmits/receives a signal to/from a user terminal. An area (shaded part in the drawing) in which a reception area 110A of the remote unit 110 of the base station 100 and a reception area 210A of the remote unit 210 of the base station 200 overlap with each other is the interference area.

In an embodiment of the present invention, interference is decreased by specifying the remote units subjected to the interference (remote units 110 and 210 in the example illustrated in FIG. 1A) and making the reception areas of the specified remote units smaller to narrow the interference area as illustrated in FIG. 1B. Hereinafter, the embodiment of the present invention is described with reference to the drawings.

(First Embodiment) FIG. 2 illustrates a schematic configuration of a base station system according to a first embodiment of the present invention. A base station system 1000 is provided with remote units 1100 and 1200, a hub unit 1300, which distributes signals to the remote units 1100 and 1200 and combines the signals from the remote units 1100 and 1200, and a signal processing unit 1400, which performs digital signal processing for transmission and reception.

The remote unit 1100 includes an antenna 1101, a wireless transmitting unit 1110, which performs up-conversion and transmitted power control and transmits the signal to a user terminal through the antenna 1101, and a wireless receiving unit 1120, which receives the signal from the user terminal through the antenna 1101 and performs down-conversion and received power control.

Figure 3:
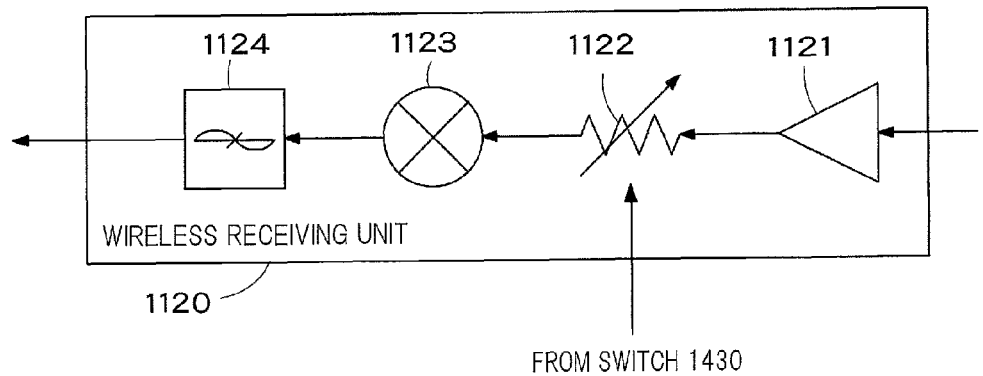
FIG. 3 is a schematic configuration diagram of a wireless receiving unit according to the first embodiment.

FIG. 3 illustrates a schematic configuration of the wireless receiving unit 1120. The wireless receiving unit 1120 is provided with a low noise amplifier (LNA) 1121, a variable resistance 1122, a mixer 1123, and a filter 1124 connected in this order. The low noise amplifier 1121 performs signal amplification with a fixed gain. The variable resistance 1122 attenuates the signal. A resistance value of the variable resistance 1122 is adjusted by a switch 1430 to be described later. The mixer 1123 performs the down-conversion of the signal to a predetermined frequency. The filter 1124 extracts the signal at a desired frequency.

Also, as illustrated in FIG. 2, the remote unit 1100 includes an antenna 1102, a wireless transmitting unit 1130, and a wireless receiving unit 1140 having configurations similar to those of the antenna 1101, the wireless transmitting unit 1110, and the wireless receiving unit 1120, respectively.

The remote unit 1200 has a configuration similar to that of the remote unit 1100 and includes antennas 1201 and 1202, wireless transmitting units 1210 and 1230, which perform the up-conversion and the transmitted power control and transmit the signals through the antennas 1201 and 1202, and wireless receiving units 1220 and 1240, which receive the signal from the user terminal through the antennas 1201 and 1202 and perform the down-conversion and the received power control.

By arranging the remote units 1100 and 1200 so as to be geographically distant from each other, they may be used as countermeasures against a dead zone of a cellular wireless system in a building and an underground mall. Although the two remote units 1100 and 1200 are provided in an example illustrated in FIG. 2, it is also possible to provide three or more remote units. Also, three or more antennas, wireless transmitting units, and wireless receiving units may be provided on each remote unit.

The hub unit 1300 includes a combining unit 1321, which combines a received signal from the antenna 1101 and the received signal from the antenna 1201, and a combining unit 1322, which combines the received signal from the antenna 1102 and the received signal from the antenna 1202. The received signals combined by the combining units 1321 and 1322 are output to the signal processing unit 1400.

The hub unit 1300 also includes distributors 1311 and 1312, which distribute transmission signals given from the signal processing unit 1400. The signals distributed by the distributor 1311 are transmitted from the antennas 1101 and 1201. Also, the signals distributed by the distributor 1312 are transmitted from the antennas 1102 and 1202.

The signal processing unit 1400 includes a transmission signal processing unit 1410 provided with two transmission systems (transmission paths), a received signal processing unit 1420 provided with two reception systems (reception paths), the switch 1430, and an interface unit 1440. The signal processing unit 1400 is a base station including a communication device including the transmission signal processing unit 1410, the received signal processing unit 1420, and the switch 1430 and the interface unit 1440.

The switch 1430 adjusts reception gains of the wireless receiving units 1120 and 1140 of the remote unit 1100 and the wireless receiving units 1220 and 1240 of the remote unit 1200. The interface unit 1440 transmits/receives the signal between the transmission signal processing unit 1410 and the received signal processing unit 1420 and an upper (wired/wireless) network.

The transmission signal processing unit 1410 applies transmission signal processing to the signal received from the network through the interface unit 1440 and outputs the same to the distributors 1311 and 1312 of the hub unit 1300.

The received signal processing unit 1420 applies received signal processing to the signals combined by the combining units 1321 and 1322 of the hub unit 1300 and transmits the signals to the network through the interface unit 1440. The reception systems (reception paths) of the received signal processing unit 1420 correspond to the combining units 1321 and 1322. Also, the received signal processing unit 1420 detects the remote units 1100 and 1200 subjected to the interference.

Figure 4:
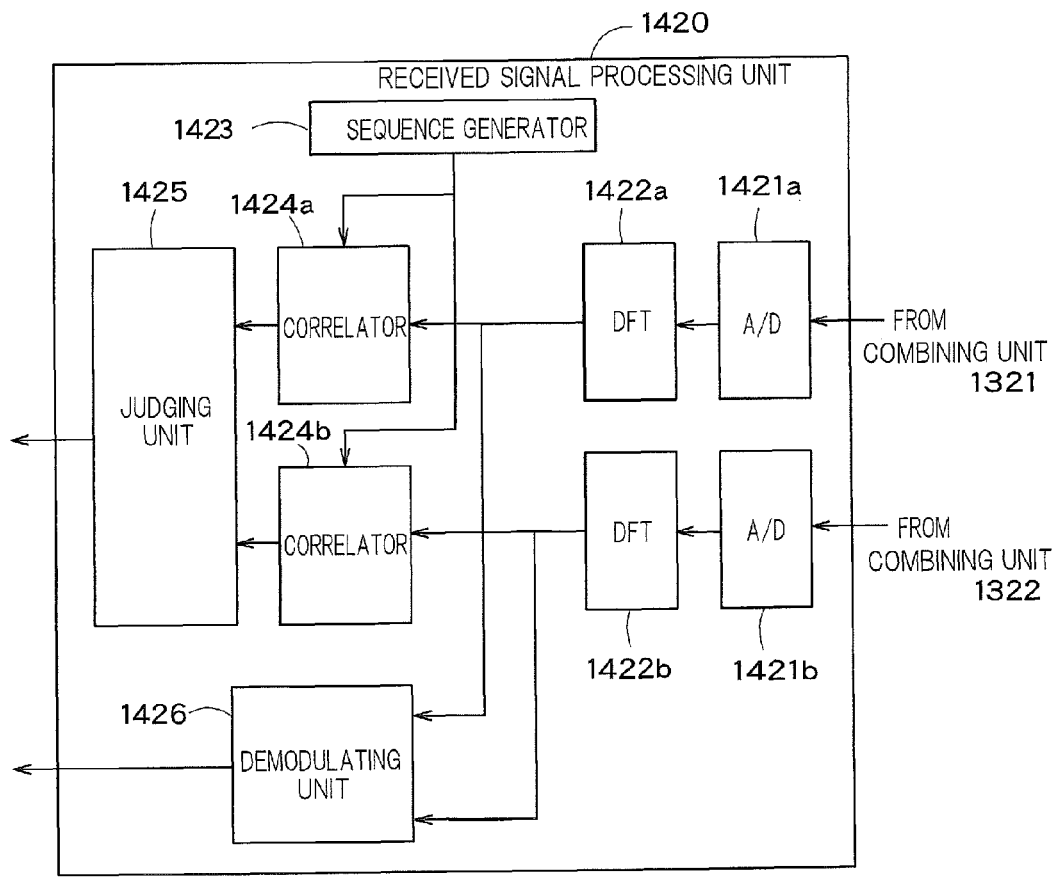
FIG. 4 is a schematic configuration diagram of a received signal processing unit according to the first embodiment.

FIG. 4 illustrates a schematic configuration of the received signal processing unit 1420. The received signal processing unit 1420 is provided with AD converting units 1421*a* and 1421*b*, DFT units 1422*a* and 1422*b*, a sequence generator 1423, correlators 1424*a* and 1424*b*, a judging unit 1425, and a demodulating unit 1426.

The AD converting unit 1421*a* converts the received signal combined by the combining unit 1321 to a digital signal. The DFT unit 1422*a* performs discrete Fourier transform of the signal output from the AD converting unit 1421*a*.

The AD converting unit 1421*b* converts the received signal combined by the combining unit 1322 to the digital signal. The DFT unit 1422*b* performs the discrete Fourier transform of the signal output from the AD converting unit 1421*b*.

The demodulating unit 1426 performs demodulation processing such as error correction decoding of the signals output from the DFT units 1422*a* and 1422*b*, that is to say, the signals from the user terminal based on a protocol of LTE.

The correlator 1424*a* calculates correlation between the signal output from the DFT unit 1422*a* and the signal generated by the sequence generator 1423. The signal generated by the sequence generator 1423 is the signal corresponding to an interference component and will be described later in detail. Also, the correlator 1424*b* calculates the correlation between the signal output from the DFT unit 1422*b* and the signal generated by the sequence generator 1423. It is also possible to combine the signal output from the DFT unit 1422*a* with the signal output from the DFT unit 1422*b* and calculate the correlation by a single correlator.

The judging unit 1425 judges presence of the interference based on the outputs of the correlators 1424*a* and 1424*b*.

Next, a method of detecting the remote units 1100 and 1200 subjected to the interference is described. In this embodiment, an interference level in uplink is measured for each of the remote units 1100 and 1200 by using the signal of the uplink from the user terminal.

As illustrated in FIG. 2, in the base station system 1000, the received signal by the remote unit 1100 and the received signal by the remote unit 1200 are combined with each other. Therefore, when the interference level in the remote unit 1100 is measured, the switch 1430 decreases the reception gains of the wireless receiving units 1220 and 1240 of the remote unit 1200, that is to say, increases the resistance values of the variable resistances thereof. Accordingly, the received signal by the remote unit 1100 is dominant in the signal input to the received signal processing unit 1420.

On the other hand, when the interference level in the remote unit 1200 is measured, the switch 1430 decreases the reception gains of the wireless receiving units 1120 and 1140 of the remote unit 1100, that is to say, increases the resistance values of the variable resistances thereof. Accordingly, the received signal by the remote unit 1200 is dominant in the signal input to the received signal processing unit 1420.

Figure 5:
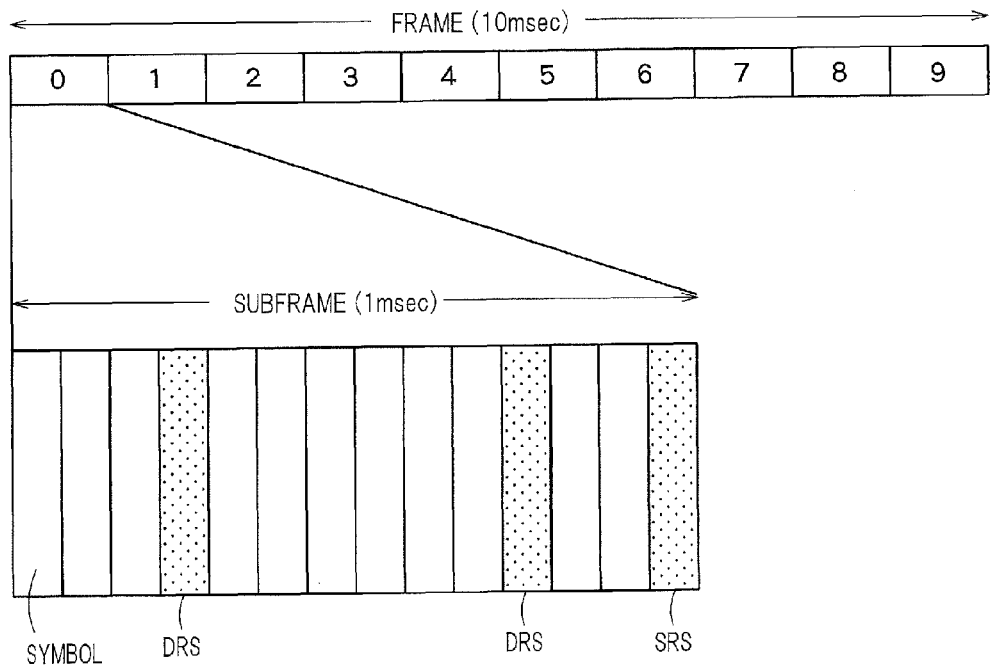
FIG. 5 is a view illustrating a frame of uplink defined by LTE.

FIG. 5 illustrates a frame of the uplink defined by the LTE. One frame is composed of 10 subframes. Since each subframe has a length of 1 msec, one frame has the length of 10 msec. Each subframe is composed of 14 symbols.

Fourth and 11th symbols of the subframe are transmitted as demodulation reference signals (hereinafter, referred to as DRSs) used for demodulation and a sounding reference signal (hereinafter, referred to as SRS) is transmitted in a last symbol as needed. Data is transmitted in remaining symbols.

Since the DRS and the SRS are reference signals which the base station knows in advance, it is preferable to measure the interference using the DRS or the SRS. The DRS is used in this embodiment. Also, a fifth subframe out of the 10 subframes is made a measurement section of the interference. The base station system 1000 transmits/receives the data to/from the user terminal according to a normal protocol of the LTE in a section other than the measurement section. Meanwhile, it is not necessary to measure in the fifth subframe of all the frames, and it is also possible to measure in a specific subframe of a specific frame.

Figure 6:
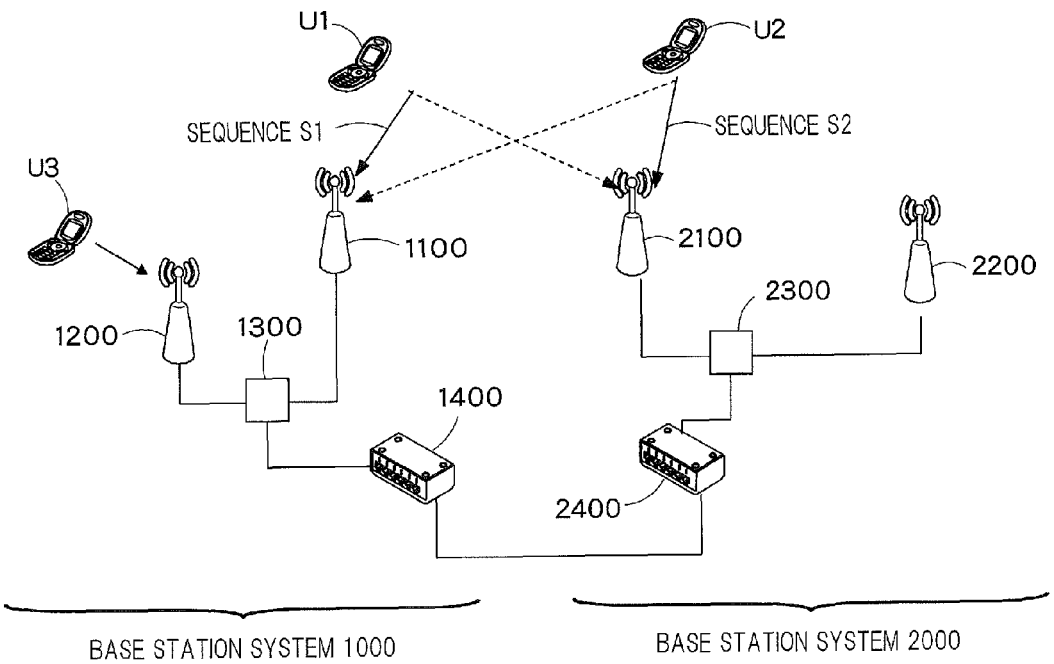
FIG. 6 is a view illustrating an example of a status in which a plurality of base station systems are provided.

FIG. 6 illustrates an example of a situation in which the base station system 1000 and a base station system 2000 having a configuration similar to that of the base station system 1000 are provided, and a method of detecting the remote unit subjected to the interference under such situation is described. The base station system 2000 is provided with remote units 2100 and 2200, a hub unit 2300, and a signal processing unit 2400. The signal processing unit 1400 and the signal processing unit 2400 are connected directly or through a controller not illustrated.

A user terminal U1 is (wirelessly) connected to the base station system 1000 to transmit/receive the signal. The user terminal U1 transmits the frame illustrated in FIG. 5 and especially transmits a sequence Si as the DRS. Similarly, a user terminal U2 is connected to the base station system 2000 to transmit/receive the signal. The user terminal U2 transmits the frame illustrated in FIG. 5 and especially transmits a sequence S2 as the DRS. The transmission signal of the user terminal U2 is also received by the base station system 1000. Also, suppose that the signal processing unit 1400 comprehends in advance the sequences S1 and S2 transmitted by the user terminals U1 and U2, respectively. Also, suppose that the signal processing unit 1400 comprehends information of timing and a frequency at which the user terminal U2 transmits, and that the interference at the timing and the frequency are measured.

The user terminal U1 is located in the vicinity of the remote unit 1100 and the user terminal U2 is located in the vicinity of the remote unit 2100. FIG. 6 illustrates the example in which the remote unit 1100 is subjected to the interference of the user terminal U2 and the remote unit 2100 is subjected to the interference of the user terminal U1. Meanwhile, a user terminal U3 is located in the vicinity of the remote unit 1200, the terminal being at a position distant from the remote units 1100 and 2100.

When it is detected whether the remote unit 1100 is subjected to the interference, the switch 1430 decreases the reception gains of the wireless receiving units 1220 and 1240 of the remote unit 1200 in a fifth subframe. For example, the resistance values of the variable resistances included in the wireless receiving units 1220 and 1240 are increased and large attenuation gains of 20 dB and 30 dB are set in the wireless receiving units 1220 and 1240. Accordingly, a signal component received by the remote unit 1200 out of the signals given to the received signal processing unit 1420 becomes significantly small and it becomes possible to detect the interference for the signal received by the remote unit 1100.

The sequence generator 1423 generates the sequence S2 of the DRS transmitted by the user terminal U2. The correlators 1424a and 1424b calculate correlation values between the signals received by the remote unit 1100 and the sequence S2.

The judging unit 1425 judges whether the remote unit 1100 is subjected to the interference based on the correlation values output from the correlators 1424a and 1424b. For example, when a sum of the correlation values output from the correlators 1424a and 1424b is larger than a predetermined threshold, it is judged that the remote unit 1100 is subjected to the interference. Also, when one of the correlation values output from the correlators 1424a and 1424b is larger than the predetermined threshold, it may be judged that the remote unit 1100 is subjected to the interference.

Similarly, when it is detected whether the remote unit 1200 is subjected to the interference, the switch 1430 decreases the reception gains of the wireless receiving units 1120 and 1140 of the remote unit 1100 in the fifth subframe. For example, the resistance values of the variable resistances included in the wireless receiving units 1120 and 1140 are increased and large attenuation gains of 20 dB and 30 dB are set in the wireless receiving units 1120 and 1140. Accordingly, the signal component received by the remote unit 1100 out of the signals given to the received signal processing unit 1420 becomes significantly small and it becomes possible to detect the interference for the signal received by the remote unit 1200.

The correlators 1424a and 1424b calculate the correlation values between the signals received by the remote unit 1200 and the DRS sequence S2 transmitted by the user terminal U2 generated by the sequence generator 1423.

The judging unit 1425 judges whether the remote unit 1200 is subjected to the interference based on the correlation values output from the correlators 1424a and 1424b. For example, when the sum of the correlation values output from the correlators 1424a and 1424b is larger than the predetermined threshold, it is judged that the remote unit 1200 is subjected to the interference. Also, when one of the correlation values output from the correlators 1424a and 1424b is larger than the predetermined threshold, it may be judged that the remote unit 1200 is subjected to the interference.

The switch 1430 returns the reception gains of the wireless receiving units 1120, 1140, 1220, and 1240 to original values in the subframes other than the fifth subframe, that is to say, in zeroth to fourth and sixth to ninth subframes. In the zeroth to fourth and sixth to ninth subframes, AD conversion, DFT processing, and the demodulation processing are applied to the subframe from the user terminal U1.

In the example illustrated in FIG. 6, the user terminal U2 is geographically close to the remote unit 1100 and is geographically distant from the remote unit 1200. Therefore, when the reception gains of the wireless receiving units 1220 and 1240 of the remote unit 1200 are decreased, the correlation value between the received signal of the remote unit 1100 and a transmitted DRS sequence S2 of the user terminal U2 generated by the sequence generator 1423 becomes large and it is understood that the remote unit 1100 is subjected to the interference.

The switch 1430 decreases the reception gain of the remote unit in which the interference is detected, that is to say, the remote unit on a service area boundary (cell boundary) of the base station system 1000 based on a judgment result of the judging unit 1425. In the example illustrated in FIG. 6, the resistance values of the variable resistances included in the wireless receiving units 1120 and 1140 of the remote unit 1100 are increased.

The base station system 2000 may perform a similar process. That is to say, when the reception gain of the remote unit 2100 is decreased, the signal processing unit 2400 of the base station system 2000 calculates the correlation value between the received signal in the remote unit 2200 and the sequence Si transmitted by the user terminal U1. Also, when the reception gain of the remote unit 2200 is decreased, the signal processing unit 2400 calculates the correlation value between the received signal in the remote unit 2100 and the sequence Si transmitted by the user terminal U1. Then, it is detected that the remote unit 2100 is subjected to the interference and the reception gain of the remote unit 2100 is decreased.

By such a process, it is possible to decrease the interference by making the reception area of the remote unit subjected to the interference smaller to narrow the interference area as illustrated in FIG. 1B.

In this manner, according to this embodiment, it is possible to specify the remote unit subjected to the interference and control the interference area to improve throughput.

Also, it is possible to inhibit the interference component from being combined with the received signal from the user terminal located at a position distant from the cell boundary (user terminal U3 in FIG. 6) in the hub unit by specifying the remote unit on the cell boundary and decreasing the reception gain of the remote unit. Therefore, it is possible to prevent deterioration in a reception quality of the signal from the user terminal located at the position distant from the cell boundary due to the interference.

In the above-described embodiment, a method of adjusting the reception gain of the remote unit in which the interference is detected may be a method of decreasing the gain by a constant amount, for example, 20 dB, when the interference level exceeds the threshold, or a method of setting two thresholds and decreasing the gain by 10 dB when the level exceeds a first threshold and decreasing the gain by 20 dB when the level exceeds a second threshold. Also, when the interference is detected in a plurality of remote units, it is possible to decrease the gains of the plurality of remote units. For example, gain adjustment to decrease the gain of the remote unit by 10 dB because the interference level is larger than the first threshold in one remote unit and to decrease the gain of the remote unit by 20 dB because the interference level is larger than the second threshold in another remote unit is also possible.

In general, once the remote unit is arranged, the position thereof is rarely changed. Therefore, when the reception gain of the remote unit in which the interference is detected is decreased, it is possible to maintain a state in which the reception gain is decreased for at least several hours. For example, it is possible to detect the interference once a day and decrease the reception gain of the remote unit on the cell boundary based on a detection result to continue this state, and detect the interference again the next day and newly adjust the gain of the remote unit based on the detection result.

Although the correlations between the signals output from the DFT units 1422*a* and 1422*b* and the signal generated by the sequence generator 1423 are calculated in the above-described embodiment, it is also possible to calculate the correlation by the signal on a time axis without applying the discrete Fourier transformation.

Although the reception gain is decreased by adjusting the value of the variable resistance of the remote unit, which is a non-measurement target, when detecting the interference in the above-described embodiment, it is only necessary to decrease a level of the signal from the remote unit, which is the non-measurement target, and it is also possible to turn off the remote unit, which is the non-measurement target, for example.

Although a case in which the number of the AD converting units in the received signal processing unit 1420 is equal to the number of the antennas provided on the remote unit, that is to say, two, is described in the above-described embodiment, it is also possible to prepare the AD converting units as many as a product of the number of the remote units and the number of the antennas, perform the AD conversion of the received signal of each antenna, and input the digital signal after the AD conversion to the correlator, thereby detecting the interference for the signal from a specified remote unit.

(Second Embodiment) In the above-described first embodiment, a received signal of a specific remote unit (measurement target) is input to a signal processing unit 1400 in a measurement section (fifth subframe) and a reception gain of the remote unit other than that (non-measurement target) is decreased. Therefore, in an example illustrated in FIG. 6, for example, a signal from a user terminal U3 located in the vicinity of a remote unit 1200 is scarcely observed by the signal processing unit 1400 while the received signal of the remote unit 1100 is observed.

That is to say, in the measurement section, the signal of the user terminal in an area other than the vicinity of the remote unit, which is the measurement target, is likely to be erroneously demodulated and throughput is likely to be deteriorated.

First, a case in which the user terminal transmits a data signal in the measurement section is considered. In LTE, the data signal is provided with an error detection function referred to as cyclic redundancy check (CRC). Therefore, when the user terminal transmits the data signal in the measurement section and the signal processing unit 1400 erroneously demodulates the signal, an error is detected by the CRC. When a base station system 1000 detects the error, the system transmits negative acknowledgment (NACK) to the user terminal to notify the terminal of occurrence of the error.

When the user terminal receives the NACK, the terminal judges that transmitted data is erroneously received and retransmits the data on a next transmission occasion. That is to say, even when the data signal transmitted by the user terminal is erroneously received in the measurement section of interference, it is extremely less likely that an effect thereof spreads to subsequent subframes.

Next, a case in which the user terminal transmits a control signal in the measurement section is considered. Although error correction decoding is applied to the control signal in the LTE, the error detection function is not provided. For example, there is a case in which the data signal is transmitted from the base station system 1000 to the user terminal and timing at which the user terminal transmits acknowledgement (ACK) and the NACK for the data signal falls upon the measurement section.

When the user terminal fails to receive the data signal and transmits the NACK and the NACK is normally received by the base station system 1000, the base station system 1000 judges that the user terminal has erroneously received the data signal and performs hybrid-ARQ (HARQ) to retransmit the data or transmit difference between the data.

However, when the timing at which the user terminal transmits the NACK overlaps with the measurement section and when the base station system 1000 erroneously judges that the NACK is the ACK, the base station system 1000 misunderstands that the user terminal has correctly demodulated the data signal and transmits next data without retransmitting the data. Since retransmission control in a radio link control (RLC) layer is provided in the LTE, a problem of data missing may be avoided even when the NACK is received to be mistaken for the ACK in this manner. However, individual missing data is not retransmitted but a large amount of data transmitted during a certain period including the missing data is retransmitted as data retransmission in the RLC layer, so that the throughput is significantly deteriorated. This embodiment prevents such significant deterioration in the throughput.

The measurement section for presence and absence of the interference is set by the base station system 1000. Therefore, the base station system 1000 knows the timing of the measurement section. The base station system 1000 also knows the timing at which the user terminal transmits the ACK and the NACK.

Then, in this embodiment, the signal processing unit 1400 forcibly judges that the received control signal is the NACK when the control signal such as the ACK and the NACK is transmitted from the user terminal in the measurement section.

For example, a received signal processing unit 1420 overwrites the signal such as the ACK and the NACK passed up from a physical layer to a MAC layer with the NACK. When the base station system 1000 judges that the ACK/NACK signal from the user terminal is the NACK, the system retransmits the data to the user terminal by the HARQ. Although there is a loss by one subframe when the user terminal transmits the ACK, it is possible to prevent the significant deterioration in the throughput caused by erroneously judging that the NACK is the ACK.

In this manner, according to this embodiment, even when the control signal is transmitted from the user terminal in the area other than the vicinity of the remote unit, which is the measurement target, in the measurement section, it is possible to measure an interference signal and specify the remote unit subjected to the interference while inhibiting the significant deterioration in the throughput.

A method by this embodiment may also be applied to the control signal other than the ACK and the NACK. For example, when it is known that there will be a notification of a rank indicator (RI), which indicates a rank of a multiple input multiple output (MIMO), in the measurement section, it becomes possible to perform the next transmission by a MIMO system with which the user terminal may surely receive by forcibly setting that there has been received the notification of a more robust low-rank value, so that an unnecessary error may be avoided.

Same applies to a modulation and coding scheme (MCS), which gives the notification of a pair of a modulation system and error correction coding, and it is possible to avoid the unnecessary error by forcibly setting the same to a more robust value.

Further, the RI and the MCS may also not be set to the robust values but forcibly be set to reliable values of which notification is given before the measurement section and in a section other than the measurement section.

(Third Embodiment) Although a measurement section is one subframe in the above-described first and second embodiments, a section in which an SRS is transmitted is made the measurement section in this embodiment. As illustrated in FIG. 5, the SRS is transmitted in a last symbol in the subframe.

FIG. 7 illustrates an example of an SRS transmission pattern of a user terminal connected to a base station system 1000. In FIG. 7, for example, a user terminal U1 transmits the SRS in a low frequency band in the last symbol of a zeroth subframe, a user terminal U3 transmits the SRS in the low frequency band in the last symbol of a first subframe, the user terminal U1 transmits the SRS in a high frequency band in the last symbol of a second subframe, and the user terminal U3 transmits the SRS in the high frequency band in the last symbol of a third subframe.

The base station systems 1000 and 2000 share the SRS transmission patterns in the base station systems with each other, and it becomes possible to measure interference using the SRS. That is to say, the interference is measured at a time and a frequency at which the SRS is transmitted in an adjacent base station system.

A method of measuring the interference using the SRS is similar to the method described in the above-described first embodiment except that a signal generated by a sequence generator 1423 is the SRS and that the measurement section is not the subframe but the symbol of the SRS, so that the description thereof is omitted.

According to this embodiment, since the last symbol of a specific subframe is made the measurement section, it is possible to shorten a time period to be spent for the measurement section.

It is likely that, the user terminal connected to its own cell transmits the SRS while the measurement of the interference is performed by using the signal of the SRS as the measurement section. Therefore, when a signal from a specific remote unit is input to a signal processing unit 1400 in the measurement section, a level of the SRS signal from the user terminal of its own cell significantly decreases. The SRS signal is principally used by the base station system to comprehend a reception status of uplink, so that, when a reception level of the SRS signal decreases, the base station system operates not to assign the band in which the SRS is transmitted to the user terminal. Therefore, it is considered that possibility of significant deterioration in throughput is low. However, when a wireless condition of the band in which the SRS is transmitted is excellent, the deterioration in the throughput may occur because an excellent band is not assigned to the user terminal.

A method of solving the problem is to overwrite a value of the reception status of the SRS received in the measurement section with a value received in a section before the measurement section and not the measurement section as described in the above-described second embodiment. If the SRS at this frequency is not received before the measurement section, it is possible to use the value of the reception status received at an adjacent frequency in place of this.

By performing such control, it is possible to measure an interference signal and specify the remote unit subjected to the interference while preventing the deterioration in the throughput even when the symbol of the SRS is used as the measurement section.

(Fourth Embodiment) The measurement of interference (specification of a remote unit subjected to the interference) is performed at a predetermined time and frequency in the above-described first to third embodiments. On the other hand, in this embodiment, the measurement is performed only when the interference is observed.

In this embodiment, a sequence generator 1423 in a received signal processing unit 1420 always generates a sequence transmitted by a user terminal connected to another base station system and correlators 1424*a* and 1424*b* calculate correlation values regardless of whether it is in a measurement section. At that time, all reception gains of remote units 1100 and 1200 are set to normal values.

The measurement is performed only when the correlation value becomes larger than a predetermined threshold in this state and a judging unit 1425 judges that the interference is observed. A method described in the above-described first to third embodiments may be applied to a method of measuring at that time.

In this manner, according to this embodiment, the measurement of the interference is performed in a state in which received signals of all the remote units are input to the received signal processing unit 1420 and the measurement section is provided only when it is judged that the interference is observed to specify the remote unit subjected to the interference. Therefore, it becomes possible to adaptively measure the remote unit subjected to the interference and adaptability to change in an external environment is improved. Since it is possible to specify the remote unit subjected to the interference only when it is necessary, it is possible to prevent deterioration in throughput due to unnecessary measurement.

(Fifth Embodiment) Although the number of a subframe used as a measurement section is not limited in the above-described first to fourth embodiments, the number of the subframe used as the measurement section is determined according to a predetermined criterion in this embodiment.

FIG. 8 illustrates an example of a frame and transmission timing of a user terminal. In FIG. 8, an up-pointing arrow indicates the timing of uplink to be described later and a down-pointing arrow indicates the timing of downlink to be described later.

For example, the user terminal transmits a data signal of the uplink in a third subframe of a second frame. In LTE, there is provided a notification of a transmission instruction of this subframe by a signal of the downlink in the subframe, which is four subframes before this subframe, that is to say, a ninth subframe of a first frame. In the ninth subframe of the first frame, there is provided the notification of ACK and NACK for the data of the uplink in the subframe, which is another four subframes before this subframe, that is to say, the data of a fifth subframe of the first frame, in addition to the transmission instruction regarding new data.

That is to say, in the LTE, eight subframes make a unit of HARQ and eight queues of the HARQ operate.

Therefore, when the subframe of the measurement section of interference is always any one of the eight subframes of the HARQ, a frequency that the data from the user terminal cannot be received in the uplink increases, the number of times of retransmission becomes larger than an upper limit, and time out occurs, so that this might negatively affect application of a user.

Therefore, a position of the subframe used as the measurement section is set so as not to overlap with a specific queue of the HARQ in this embodiment. In other words, the measurement section is set such that the frequency that the measurement section and the transmission timing of a specific user terminal overlap with each other is not larger than a predetermined value.

For example, when the subframe corresponding to a certain queue of the HARQ is made the measurement section, the subframe corresponding to another queue of the HARQ is then made the measurement section.

By setting the subframe used as the measurement section in this manner, it is possible to avoid concentration of the measurement section to the specific queue of the HARQ. According to this, it is possible to prevent a state in which the signal of the uplink cannot be received in the measurement section and the application of the user is negatively affected.

(Sixth Embodiment) Although it is described to prevent significant deterioration in throughput by overwriting a control signal from another user terminal in a measurement section in the above-described second embodiment, it is configured such that transmission from the user terminal connected to a base station system 1000 is not performed in the measurement section in this embodiment. In other words, interference is measured when there is no transmission from the user terminal connected to the base station system 1000.

For example, a case in which the user terminal transmits a data signal of uplink to a third subframe of a second frame in FIG. 8 is considered. In LTE, there is provided a notification of a transmission instruction of this subframe by a signal of the downlink in the subframe, which is four subframes before this subframe, that is to say, a ninth subframe of a first frame. In the ninth subframe of the first frame, there is provided the notification of ACK and NACK for the data of the uplink of the subframe, which is another four subframes before this subframe, that is to say, the data of a fifth subframe of the first frame, in addition to the transmission instruction regarding new data.

Therefore, when the interference is measured by making the third subframe of the second frame the measurement section, the user terminal does not transmit the data in the third subframe of the second frame, which is the measurement section, unless the base station system 1000 issues the transmission instruction in the downlink of the subframe, which is four subframes before this subframe.

In this manner, it becomes possible to prevent the transmission from the user terminal in the measurement section by not issuing the transmission instruction to the subframe, which is four subframes before the measurement section, that is to say, the ninth subframe of the first frame, and the interference from another base station system may be measured safely.

However, the base station system 1000 transmits the NACK in the ninth subframe of the first frame when an error is observed in the uplink of the subframe, which is another four subframes before this subframe, that is to say, the fifth subframe of the first frame, so that the user terminal transmits (retransmits) in the third subframe of the second frame, which is the measurement section. Therefore, the measurement is executed in the third subframe of the second frame only when a new transmission instruction is not issued in the subframe, which is four subframes before the measurement section, and the signals from all the users may be normally received in the uplink in the subframe, which is another four subframes before the subframe, in this embodiment.

According to this, it becomes possible to perform the interference measurement when there is no transmission from the user terminal connected to the base station system 1000, and the interference from another base station system may be measured safely.

A method of avoiding the transmission from the user terminal connected to the base station system 1000 is described in consideration of a mechanism of HARQ when the user terminal transmits the data in the uplink in this embodiment. This method may also be applied to a case in which the user terminal transmits control information. In the LTE, it is possible to control a cycle and offset of the subframe in which the user terminal transmits the control information for each user. That is to say, although a transmission cycle of the data signal is 8 and an offset value is 1 (in an example illustrated in FIG. 7) in this embodiment, when they are replaced with the cycle and the offset with which the user terminal transmits the control information, a similar process may also be applicable to a case in which the control signal is transmitted.

In the above-described first to sixth embodiments, it is possible that a controller connected to signal processing units 1400 of a plurality of base station systems so as to be communicatable is provided, and the controller determines the reception gain of which remote unit is decreased based on a judgment result of a judging unit 1425 to control a switch 1430 of each base station system.

Meanwhile, in the present invention, which remote units are subjected to the interference from the user terminal connected to another base station, out of a plurality of remote units of a certain base station, is measured, and the interference is decreased by adjusting power of the remote unit based on a measurement result. The method of measuring remote units subjected to the interference according to this embodiment may also be applied to the measurement of which in the vicinity of remote unit the user terminal connected to its own base station is located. This may be realized by replacing a sequence used in the measurement (calculation of correlation value) described in the above-described embodiment with the sequence transmitted by the user terminal connected to its own base station. In this manner, if which in the vicinity of remote unit the user terminal connected to its own base station is located is known, it becomes possible to decrease unnecessary interference by decreasing the gain of the remote unit in the vicinity of which the user terminal is not located or to realize low power consumption by turning off the remote unit in the vicinity of which the user terminal is not located.

While certain embodiments have been described, these embodiments have been presented by way of example only, and are not intended to limit the scope of the inventions.

Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication device for communicating with N (N is an integer not smaller than 2) remote units, each remote unit including a plurality of antennas, wireless transmitting units for transmitting signals to a first user terminal through the antennas, and wireless receiving units for receiving signals from the first user terminal through the antennas, the communication device comprising:
    a transmission signal processing unit configured to output a transmission signal to be transmitted to the first user terminal;
    a received signal processing unit, to which received signals from the plurality of the wireless receiving units are combined and input through a plurality of paths as many as the number not larger than the number of the antennas provided on the remote units, the received signal processing unit specifying a remote unit subjected to interference by a second user terminal different from the first user terminal; and
    a switch configured to adjust a reception gain of each of the wireless receiving units,
    wherein the switch decreases the reception gain of the wireless receiving unit included in N−1 remote units out of the N remote units in a predetermined measurement section, and
    the received signal processing unit calculates a correlation value between the combined received signals and a reference signal transmitted by the second user terminal in the measurement section to judge that the remote unit of which reception gain is not decreased is subjected to the interference by the second user terminal when the correlation value is larger than a predetermined threshold.

2. The device according to claim 1, wherein the switch decreases the reception gain of the wireless receiving unit included in the remote unit judged to be subjected to the interference by the second user terminal by the received signal processing unit.

3. The device according to claim 1, wherein the received signal processing unit includes
    an analog/digital converting unit configured to convert the combined received signals to a digital signal,
    a converting unit configured to apply discrete Fourier transform to the digital signal,
    a demodulating unit configured to demodulate an output signal of the converting unit,
    a generator configured to generate the reference signal transmitted by the second user terminal,
    a correlator configured to calculate the correlation value between the output signal of the converting unit and the reference signal, and
    a judging unit configured to compare the correlation value calculated by the correlator with the predetermined threshold and judge that the remote unit of which reception gain is not decreased is subjected to the interference by the second user terminal when the correlation value is larger than the predetermined threshold.

4. The device according to claim 2, wherein the received signal processing unit includes
    an analog/digital converting unit configured to convert the combined received signals to a digital signal,
    a converting unit configured to apply discrete Fourier transform to the digital signal,
    a demodulating unit configured to demodulate an output signal of the converting unit,
    a generator configured to generate the reference signal transmitted by the second user terminal,
    a correlator configured to calculate the correlation value between the output signal of the converting unit and the reference signal, and
    a judging unit configured to compare the correlation value calculated by the correlator with the predetermined threshold and judge that the remote unit of which reception gain is not decreased is subjected to the interference by the second user terminal when the correlation value is larger than the predetermined threshold.

5. The device according to claim 1, wherein, when the received signal processing unit receives control information from the first user terminal in the predetermined measurement section, the received signal processing unit sets the received control information to a predetermined value.

6. The device according to claim 2, wherein, when the received signal processing unit receives control information from the first user terminal in the predetermined measurement section, the received signal processing unit sets the received control information to a predetermined value.

7. The device according to claim 3, wherein, when the received signal processing unit receives control information from the first user terminal in the predetermined measurement section, the received signal processing unit sets the received control information to a predetermined value.

8. The device according to claim 4, wherein, when the received signal processing unit receives control information from the first user terminal in the predetermined measurement section, the received signal processing unit sets the received control information to a predetermined value.

9. The device according to claim 5, wherein, when the received signal processing unit receives an ACK/NACK signal from the first user terminal in the predetermined measurement section, the received signal processing unit sets the received ACK/NACK signal to a NACK signal.

10. The device according to claim 8, wherein, when the received signal processing unit receives an ACK/NACK signal from the first user terminal in the predetermined measurement section, the received signal processing unit sets the received ACK/NACK signal to a NACK signal.

11. The device according to claim 1, wherein the predetermined measurement section is a section of a last symbol in a predetermined subframe and the reference signal is a sounding reference signal (SRS).

12. The device according to claim 4, wherein the predetermined measurement section is a section of a last symbol in a predetermined subframe and the reference signal is a sounding reference signal (SRS).

13. The device according to claim 1, wherein
    the received signal processing unit also calculates the correlation value in a section other than the measurement section and judges that at least any one of the N remote units is subjected to the interference by the second user terminal when the correlation value is larger than the predetermined threshold, and
    the switch decreases the reception gain of the wireless receiving unit in the predetermined measurement section after the received signal processing unit judges that at least any one of the remote units is subjected to the interference by the second user terminal.

14. The device according to claim 10, wherein
the received signal processing unit also calculates the correlation value in a section other than the measurement section and judges that at least any one of the N remote units is subjected to the interference by the second user terminal when the correlation value is larger than the predetermined threshold, and
the switch decreases the reception gain of the wireless receiving unit in the predetermined measurement section after the received signal processing unit judges that at least any one of the remote units is subjected to the interference by the second user terminal.

15. The device according to claim 1, wherein the measurement section is set such that a frequency that transmission timing of the first user terminal and the measurement section overlap with each other is not larger than a predetermined value.

16. The device according to claim 10, wherein the measurement section is set such that a frequency that transmission timing of the first user terminal and the measurement section overlap with each other is not larger than a predetermined value.

17. The device according to claim 1, wherein the switch decreases the reception gain of the wireless receiving unit in the predetermined measurement section only when the transmission signal processing unit does not output a transmission instruction of new data to the first user terminal a first predetermined time period before the predetermined measurement section and the received signal processing unit is able to normally receive a signal from the first user terminal a second predetermined time period before the predetermined measurement section, the second predetermined time period being longer than the first predetermined time period.

18. The device according to claim 10, wherein the switch decreases the reception gain of the wireless receiving unit in the predetermined measurement section only when the transmission signal processing unit does not output a transmission instruction of new data to the first user terminal a first predetermined time period before the predetermined measurement section and the received signal processing unit is able to normally receive a signal from the first user terminal a second predetermined time period before the predetermined measurement section, the second predetermined time period being longer than the first predetermined time period.

19. A base station, comprising:
a communication device for communicating with N (N is an integer not smaller than 2) remote units, each remote unit including a plurality of antennas, wireless transmitting units for transmitting signals to a first user terminal through the antennas, and wireless receiving units for receiving signals from the first user terminal through the antennas, the communication device including:
a transmission signal processing unit configured to output a transmission signal to be transmitted to the first user terminal;
a received signal processing unit, to which received signals from the plurality of the wireless receiving units are combined and input through a plurality of paths as many as the number not larger than the number of the antennas provided on the remote units, the received signal processing unit specifying a remote unit subjected to interference by a second user terminal different from the first user terminal; and
a switch configured to adjust a reception gain of each of the wireless receiving units,
wherein the switch decreases the reception gain of the wireless receiving unit included in N−1 remote units out of the N remote units in a predetermined measurement section, and
the received signal processing unit calculates a correlation value between the combined received signals and a reference signal transmitted by the second user terminal in the measurement section to judge that the remote unit of which reception gain is not decreased is subjected to the interference by the second user terminal when the correlation value is larger than a predetermined threshold; and
an interface unit configured to perform communication between the transmission signal processing unit and the received signal processing unit and an upper network.

20. A base station system, comprising:
N (N is an integer not smaller than 2) remote units, each remote unit including a plurality of antennas, wireless transmitting units configured to transmit signals to a first user terminal through the antennas, and wireless receiving units configured to receive the signals from the first user terminal through the antennas;
a base station; and
a hub unit,
wherein the base station includes
a communication device for communicating with the N remote units, the communication device including
a transmission signal processing unit configured to output a transmission signal to be transmitted to the first user terminal,
a received signal processing unit, to which received signals from the plurality of the wireless receiving units are combined and input through a plurality of paths as many as the number not larger than the number of the antennas provided on the remote units, the received signal processing unit specifying a remote unit subjected to interference by a second user terminal different from the first user terminal, and
a switch configured to adjust a reception gain of each of the wireless receiving units,
wherein the switch decreases the reception gain of the wireless receiving unit included in N−1 remote units out of the N remote units in a predetermined measurement section, and
the received signal processing unit calculates a correlation value between the combined received signals and a reference signal transmitted by the second user terminal in the measurement section to judge that the remote unit of which reception gain is not decreased is subjected to the interference by the second user terminal when the correlation value is larger than a predetermined threshold, and
an interface unit configured to perform communication between the transmission signal processing unit and the received signal processing unit and an upper network, and
the hub unit includes a distributor configured to distribute the transmission signal output from the transmission signal processing unit to the wireless transmitting units, and a combining unit configured to combine the signals received by the wireless receiving units and output the combined signal to the received signal processing unit.

* * * * *